(12) United States Patent
Osakabe et al.

(10) Patent No.: US 8,223,405 B2
(45) Date of Patent: Jul. 17, 2012

(54) CONTACT IMAGE SENSOR AND IMAGE READER

(75) Inventors: Yoshinori Osakabe, Seto (JP); Tatsuya Sato, Ichinomiya (JP); Akihiro Sakakibara, Toyota (JP); Takashi Ohama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/371,398

(22) Filed: Feb. 11, 2012

(65) Prior Publication Data

US 2012/0140294 A1 Jun. 7, 2012

Related U.S. Application Data

(62) Division of application No. 11/476,907, filed on Jun. 29, 2006, now Pat. No. 8,115,971.

(30) Foreign Application Priority Data

Jun. 30, 2005 (JP) ................................. 2005-192522

(51) Int. Cl.
*H04N 1/40* (2006.01)
*H04N 1/04* (2006.01)

(52) U.S. Cl. ......................... 358/471; 358/474; 358/494

(58) Field of Classification Search ........................ None
See application file for complete search history.

(56) References Cited

U.S. PATENT DOCUMENTS

| 6,801,343 | B1 * | 10/2004 | Sheng ............................. 358/474 |
| 2003/0197900 | A1 * | 10/2003 | Hiromatsu ..................... 358/474 |
| 2005/0088706 | A1 * | 4/2005 | Lin ................................ 358/474 |

FOREIGN PATENT DOCUMENTS

| JP | H09-261424 A | 10/1997 |
| JP | H10-285342 A | 10/1998 |
| JP | 2002-229133 A | 8/2002 |
| JP | 2005-003778 A | 1/2005 |

* cited by examiner

*Primary Examiner* — James A Thompson
(74) *Attorney, Agent, or Firm* — Baker Botts L.L.P.

(57) ABSTRACT

An image reader includes a casing, a contact glass plate, a contact image sensor, and a sliding mechanism; wherein the contact image sensor has a housing, a light source attached to the housing so as to face the contact glass plate, a plurality of light receiving elements attached to the housing so as to face the contact glass plate and aligned in parallel in a longitudinal direction of the housing, and a bearing formed integral to the housing at a position below a lower surface of the housing; and the sliding mechanism includes a guide shaft provided on the casing and extending in a short direction of the housing and inserted through the bearing, and an urging member elastically which urges the guide shaft toward the contact glass plate so that the housing is pressed against the contact glass plate.

20 Claims, 12 Drawing Sheets

CONTACT IMAGE SENSOR AND IMAGE READER

CROSS REFERENCE TO RELATED APPLICATIONS

This application is a divisional application of U.S. patent application Ser. No. 11/476,907, filed on Jun. 29, 2006, which claims the benefit of Japanese Patent Application No. 2005-192522, filed on Jun. 30, 2005, the disclosures of which are incorporated herein by reference in their entirety.

BACKGROUND OF THE INVENTION

1. Field of the Invention

The present invention relates to an image reader employed in an MFD (Multi Function Device), etc., and particularly relates to a structure of a contact image sensor which is incorporated in an image reader.

2. Description of the Related Art

Conventionally, a CCD sensor or a contact image sensor (CIS) is used as a sensor of an image reader. A CCD sensor is constructed of a light source, a mirror, a lens, a CCD and the like. Image reading is performed by the light source illuminating light onto a document (original) and the CCD receiving the reflected light, and has a feature that a focal length is secured by using a plurality of mirrors to make the reflected light be converged to the lens.

For example, a supporting structure of a scanner unit which uses a CCD is disclosed in Japanese Patent Application Laid-open No. 2002-229133.

Meanwhile, with a CIS, light emitted from a light source irradiates a document, and image reading is performed by the reflected light being received by a light receiving element. Normally, a plurality of light receiving elements are positioned in array form with respect to a reading area (reading region). To irradiate incident light onto or receive reflected light from the reading area reliably, the CIS is positioned in close contact with a glass plate on which a document is placed. A member and the like which urges the CIS into close contact with the glass plate is thus required.

For example, in an image sensor disclosed in Japanese Patent Application Laid-open No. 10-285342, in a process of reading a document, the document is fed while being put in close contact with a cover glass by a roller and the like.

FIG. 11 is an exploded perspective view of a fixing structure for a close-contact image sensor in an image reader described in Japanese Patent Application Laid-open No. 2005-3778. This close-contact image sensor 1 has a sensor on an upper surface thereof, and has positioning portions 7a and 7b and a fixing projection 5 on a side of the lower surface of the close-contact image sensor 1. The positioning portion 7a is disposed on one side surface (at the front left side in FIG. 11) in a short direction of the close-contact image sensor 1, substantially at the center in a longitudinal direction of the close-contact image sensor 1, and the positioning portion 7a is constructed of ribs 8a and 8b extending vertically downward from a lower end of the close-contact image sensor 1, and a groove 9a formed or defined by the ribs 8a and 8b. Here, the ribs 8a and 8b are formed at a spacing distance or interval which is substantially equal to the diameter of a shaft 4. The positioning portion 7b is disposed on the other side surface (at the inner right side in FIG. 11) facing the positioning portion 7a and is constructed of the ribs 8c and 8d extending vertically downward from the lower end of the close-contact image sensor 1, and a groove 9b defined by the ribs 8c and 8d. Here, the ribs 8c and 8d are also formed at a spacing distance which is substantially equal to the diameter of the shaft 4. The fixing projection 5, having a cylindrical form of predetermined diameter and predetermined length, is disposed so as to extend vertically downward from the lower end of the close-contact image sensor 1 at the substantially central position of the close-contact image sensor 1. The positioning portions 7a, 7b and the fixing projection 5 are formed integral to the close-contact image sensor.

A bracket 3 is positioned below the close-contact image sensor 1 and has a plurality of through holes 12a, 12b, and 15 at the substantially central portion of the bracket 3. In the bracket 3, the through hole 15 is formed at a position opposing to the fixing projection 5 of the close-contact image sensor 1, and the through holes 12a and 12b are formed at positions opposing projections 22a and 22b, respectively, of a bearing 2 which will be described later. Also, the bracket 3 has spring fixing portions on upper surface side, in the vicinity of both ends, respectively, in the longitudinal direction of the close-contact image sensor 1, and has springs 11 fixed onto the spring fixing portions, respectively.

The bearing 2 has, at its lower end, a groove 21 which engages with the shaft 4, and has, on its upper end surface, projections 22a and 22b and a recess 25. The groove 21 is formed in a shape which substantially matches the outer diameter shape of the shaft 4, and the bearing 2 is attached or mounted to be movable along the axial direction of the shaft 4. Also, a belt fixing section 23, for connection to a driving belt 6, is provided on a side surface (front right surface in FIG. 11) of the bearing 2.

The bracket 3 is fixed to the bearing 2 by positioning the bracket 3 on an upper surface of the bearing 2 and fitting the projections 22a and 22b of the bearing 2 into the through holes 12a and 12b, respectively, of the bracket 3. Furthermore, the close-contact image sensor 1 is fixed to the bearing 2 by positioning the close-contact image sensor 1 above the bracket 3 via the springs 11, and by inserting the fixing projection 5 of the close-contact image sensor 1 through the through hole 15 of the bracket 3 so as to fit the fixing projection 5 into the recess 25 of the bearing 2. At this time, the positioning portions 7a and 7b of the close-contact image sensor 1 approach the respective side surfaces, in the axial direction of the shaft 4, of the bearing 2 to sandwich the shaft 4 by the ribs 8a and 8b of the positioning portion 7a, and to sandwich the shaft 4 by the ribs 8c and 8d of the positioning portion 7b.

For an image to be read finely from a document, the longitudinal direction (primary scanning direction) of the close-contact image sensor needs to be orthogonal to the axial direction (secondary scanning direction) of the shaft when the close-contact image sensor is sliding. However, in the fixing structure of the close-contact image sensor in image reader described in Japanese Patent Application Laid-open No. 2005-3778, the close-contact image sensor is held by the bracket and the bearing and is attached or mounted onto the shaft such that the close-contact image sensor and the grooves formed on the bearing are engaged with the shaft. Accordingly, the precision of orthogonality of the primary scanning direction and the secondary scanning direction is thus determined by the precision of attachment for the shaft and the bearing, the precision of attachment for the bearing and the bracket, and the precision of attachment for the bracket and the close-contact image sensor. That is, for the primary scanning direction and the secondary scanning direction to be accurately orthogonal, high precision of attachment for the shaft and the bearing, high precision of attachment for the bearing and the bracket, and high precision of attachment for the bracket and the close-contact image sensor are required.

However, the operation or work for accurately making the primary scanning direction and secondary scanning direction orthogonal by mounting or attaching the bearing onto the shaft with high precision, by mounting or attaching the bracket onto the bearing with high precision, and by mounting or attaching the close-contact image sensor onto the bracket with high precision is not easily performed because errors of the three attaching or mounting operations accumulate. In addition, since the shaft, the bracket, and the bearing are required, the mechanism is complicated and the number of parts is great. This consequently leads to increased parts cost and assembly cost of the image reader, thereby increasing the manufacturing cost of the image reader.

Japanese Published Application Laid-open No. 09-261424 discloses an image reader constructed of a contact glass, a lead shaft, a driving wire, a slide bearing having a wire clamp, a grounded roller, and a leaf spring. The close-contact image sensor is pressed against the contact glass by the grounded roller and the leaf spring, and reads an image of a document placed on the contact glass as the slide bearing is sliding while being in contact with the lead shaft upon receiving a driving force from the driving wire engaged with the wire clamp.

In the image reader described in Japanese Patent Application Laid-open No. 09-261424, it is clearly disclosed that the housing of the close-contact image sensor is formed of aluminum. However, it is not clearly disclosed that the slide bearing is formed integral to the housing of the close-contact image sensor.

SUMMARY OF THE INVENTION

An object of the present invention is to provide an image reader in which accurate orthogonality of a longitudinal direction of a sensor (contact image sensor) and an axial direction of a guide (shaft) is realized at low cost, and a sensor (contact image sensor) usable in the image reader.

According to a first aspect of the present invention, there is provided a sensor including: a housing which has an elongate rectangular parallelepiped shape and which is moved along a predetermined guide in a short direction of the housing; a light source attached to the housing; a light guide which is provided on the housing to be exposed on a surface of the housing and extended in a longitudinal direction of the housing; a plurality of light receiving elements attached to the housing and aligned in parallel along the longitudinal direction; and a guide receiving portion formed on the housing and engaging with the guide.

In the present invention, the sensor scans a document. Specifically, as the housing is slid along the guide, the light source which is provided on the housing irradiates light onto the document and the light receiving elements provided on the housing receive the reflected light. Each of the light receiving elements outputs a predetermined signal (image signal) based on the received light. The housing has the guide receiving portion, and the guide engages with the guide receiving portion. The guide is thus directly attached to the housing of the sensor. In other words, although the conventional contact image sensor has a holder which holds the housing and this holder is coupled to the guide shaft, whereas in the sensor according to the present invention, the holder is omitted and the housing and the guide are directly connected.

The number of parts constructing the sensor is thus reduced and the sensor can be positioned precisely with respect to the guide. To describe in more detail, when the contact image sensor is coupled to the guide shaft via the housing and the holder as in the conventional case, the precision of positioning of the contact image sensor with respect to the guide shaft is determined by factors such as the precision of attachment for the housing and the holder and the precision of attachment for the holder and the guide shaft. Thus, as described above, it is generally difficult to realize an accurately orthogonal relationship between the axial direction of the guide shaft and the longitudinal direction of the contact image sensor. However, in the present invention, since the guide is directly engaged with the housing, an accurately orthogonal relationship between the axial direction of the guide and the longitudinal direction of the sensor is realized easily just by the housing being attached or mounted accurately onto the guide.

In the sensor of the present invention, the guide receiving portion may support the guide movably in a direction orthogonal to both the longitudinal direction and the short direction; and the sensor may further includes a sliding member which elastically urges the housing in the direction orthogonal to both the longitudinal direction and the short direction and which is movable slidingly in the short direction along a predetermined plane.

In this case also, since the guide is directly attached to the housing of the sensor, the number of parts constructing the sensor is reduced and the sensor is positioned with good precision with respect to the guide. In addition, the housing can be slid smoothly by the sliding member. An accurately orthogonal relationship can thus be maintained between the axial direction of the guide and the longitudinal direction of the sensor even during sliding of the housing.

In the sensor of the present invention, the sliding member may be arranged at each of both ends in the longitudinal direction of the housing.

In this housing, the housing can be slid further smoothly.

In the sensor according to the present invention, the sliding member may have an elastic body which urges the housing.

In this case, the means which urges the housing has an extremely simple structure, and the housing can be urged reliably.

In the sensor of the present invention, the guide receiving portion may have a pair of bosses formed integral to the housing at a pair of side surfaces, respectively, in a short direction of the housing; and each of the bosses may have a guide insertion hole through which the guide penetrates.

In this case, the structure of the bearing is made extremely simple. The bearing is thus constructed at low cost and the manufacturing cost of the housing is consequently reduced.

In the sensor of the present invention, the housing may have a coupling portion to which a driving force from the sliding mechanism which slides the housing is transmitted.

In this case, the coupling portion forms an action point on which the driving force (external force for sliding the housing along the guide) acts. The housing thus receives the driving force directly and can be slid rapidly.

In the sensor of the present invention, the coupling portion may be provided on the guide receiving portion.

In this case, the guide receiving portion receives the driving force. Since this guide receiving portion is in a state of being supported by the guide, the action point of the driving force is positioned in the vicinity of the guide. Thus, even when the driving force acts on the guide receiving portion, a rotational moment (the moment which rotates the housing with respect to the axial direction of the guide) applied to the housing is small. Thus, when the housing slides with respect to the guide, the orthogonal relationship between the axial direction of the guide and the longitudinal direction of the sensor is maintained.

In the sensor of the present invention, the guide receiving portion may be arranged at a center of the housing.

In this case, the housing is supported at its center by the guide. Thus, when the housing slides with respect to the guide, the orthogonal relationship between the axial direction of the guide and the longitudinal direction of the sensor is maintained reliably.

In the sensor of the present invention, a connector which is an output terminal for signals outputted by the light receiving elements may be provided on the housing; and a cable holder which holds an electrical cable connected to the connector may be provided integral to the housing.

In this case, the electric cable can be wired compactly. Further, by the electric cable being held by the cable holder, even when tension arises in the electric cable, an excessive mechanical load is not applied to the connector. Furthermore, since the cable holder is provided integrally to the housing, the cable holder can be manufactured together with the housing and at a low cost.

In the sensor of the present invention, the cable holder may be constructed of a plate-like member which is positioned in parallel to and close to a side surface in the short direction of the housing.

In this case, the cable holder is made extremely simple in structure and the cable holder can be manufactured together with the housing further inexpensively.

In the sensor of the present invention, the guide receiving portion may be formed integral to the housing at a position below a lower surface of the housing; the guide may be a shaft; and the sensor may be used in a state that an upper surface of the housing is in close contact with a rear surface of a light transmitting plate having a surface onto which a document is placed.

In this case, since the guide receiving portion is formed integral to the housing at a position lower than the lower surface of the housing, the sensor can be used in a state that the upper surface of the housing is in close contact with the back surface of the light transmitting plate. Also, since the guide is a shaft, the structure is extremely simple.

According to a second aspect of the present invention, there is provided an image reader, including: a casing having an opening in an upper surface thereof; a contact glass plate, which is attached to the casing to be exposed in the opening, and in which a document placing surface is defined by peripheral edges of the opening; a contact image sensor which is arranged in the casing and which is slid to scan a document placed on the document placing surface; and a sliding mechanism which slides the contact image sensor; wherein: the contact image sensor includes: a housing which has an elongate, rectangular parallelepiped shape; a light source attached to the housing so as to face the contact glass plate; a plurality of light receiving elements which are attached to the housing so as to face the contact glass plate and which are aligned in parallel along a longitudinal direction of the housing; a bearing which is provided integral to the housing at a position below a lower surface of the housing; and the sliding mechanism includes: a guide shaft which is provided on the casing and which is extended in a short direction of the casing and is inserted through the bearing; and an urging member which elastically urges the guide shaft toward the contact glass plate such that the casing is pressed against the contact glass plate.

In the image reader of the present invention, in a state that a document is placed on the document placing surface, the contact image sensor scans the document while being slid by the sliding mechanism. Specifically, as the contact image sensor is slid along the guide shaft, the light source provided in the housing of the contact image sensor irradiates light onto the document and the light receiving elements receive the light reflected off from the document. In this process, since the urging member elastically presses the housing of the contact image sensor against the contact glass plate, even when there is distortion of the housing and the like, the contact image sensor and the contact glass plate are constantly kept close to each other and the distance between the contact image sensor and the contact glass plate is maintained to be constant. The contact image sensor can thus exhibit an image reading function. Each of the light receiving elements outputs a predetermined signal (image signal) based on the received light. The guide shaft is inserted through the bearing. The guide shaft is thus directly attached to the housing of the contact image sensor.

Although the conventional contact image sensor has a holder which holds the housing and has a structure with which this holder is coupled to the guide shaft, whereas in the image reader according to the present invention, the holder as a part of the contact image sensor is omitted and a structure is provided in which the housing and the guide shaft are connected directly. Accordingly, the number of parts constructing the image reader is reduced and the contact image sensor is positioned with high precision with respect to the guide shaft.

In the image reader of the present invention, the bearing may have a pair of bosses formed integral to the housing at a pair of side surfaces, respectively, in the short direction of the housing; and each of bosses of the pair may have a guide shaft insertion hole through which the guide shaft penetrates.

In the image reader of the present invention, the housing may have a coupling portion to which a driving force from the sliding mechanism is transmitted.

In the image reader of the present invention, the coupling portion may be provided on the bearing.

In the image reader of the present invention, the bearing may be arranged at a center of the housing.

In the image reader of the present invention, the urging member may be a coil spring.

In this case, the urging force applied to the guide shaft can be set easily. The structure for urging the guide shaft is also made extremely simple.

In the image reader of the present invention, a connector which is an output terminal for signals outputted by the light receiving elements may be provided on the housing; and a cable holder which holds an electrical cable connected to the connector may be provided integral to the housing.

In the image reader of the present invention, the cable holder may be constructed of a plate-like member which is positioned in parallel to and close to a side surface in the short direction of the housing.

In the image reader of the present invention, the urging member may be provided between the guide shaft and an inner bottom portion of the casing.

In this case, since the urging force is applied to the guide shaft, the distance between the housing and the contact glass plate can be maintained to be constant without directly applying the urging force to the housing.

According to a third aspect of the present invention, there is provided an image reader, including: a casing having an opening in an upper surface thereof; a contact glass plate, which is attached to the casing to be exposed in the opening, and in which a document placing surface is defined by peripheral edges of the opening; a contact image sensor which is arranged in the casing and which is slid to scan a document placed on the document placing surface; and a sliding mechanism which slides the contact image sensor; wherein: the contact image sensor includes a housing which has an elongate, rectangular parallelepiped shape, a light source attached to the housing so as to face the contact glass plate, a plurality of light receiving elements which are attached to the housing so as to face the contact glass plate and which are aligned in parallel in a longitudinal direction of the housing, a bearing which is provided integral to the housing at a position below a lower surface of the housing; the sliding mechanism includes a guide shaft which is provided on the casing, and which is extended in a short direction of the casing and is inserted through the bearing; and the bearing supports the guide shaft to be movable in a direction orthogonal to both the longitudinal direction and the short direction; and the sensor is provided with a sliding member which elastically urges the housing in the direction orthogonal to both the longitudinal direction and the short direction and which aid smooth sliding in the short direction.

In the image reader of the present invention, in with a document being placed on the document placing surface, the contact image sensor scans the document while the contact image sensor is being slid by the sliding mechanism. Specifically, as the contact image sensor is slid along the guide shaft, the light source, disposed in the housing of the contact image sensor, irradiates light onto the document, and the light receiving elements receive the light reflected off from the document. At this time, the sliding member elastically presses the housing in the direction orthogonal to both the longitudinal direction and the short direction of the housing, namely, elastically presses the housing against the contact glass plate. Accordingly, even when there is distortion of the housing and the like, the contact image sensor and the contact glass plate are constantly kept close to each other and the distance between the contact image sensor and the contact glass plate is maintained to be constant. The contact image sensor can thus exhibit an image reading function. Each of the light receiving elements outputs a predetermined signal (image signal) based on the received light. The guide shaft is inserted through the bearing. Consequently, the guide shaft is directly attached to the housing of the contact image sensor.

Although the conventional contact image sensor has a holder which holds the housing and has a structure in which this holder is coupled to the guide shaft, whereas in the image reader of the present invention, the holder as a part of the contact image sensor is omitted, and a structure is provided in which the housing and the guide shaft are connected directly. The number of parts constructing the image reader is thus reduced and the contact image sensor is positioned with high precision with respect to the guide shaft. To describe in detail, when a contact image sensor is coupled to a guide shaft via a housing and a holder as in the conventional case, the precision of positioning of the contact image sensor with respect to the guide shaft is determined by factors such as the precision of attachment for the housing and the holder and the precision of attachment for the holder and the guide shaft. Accordingly, as described above, it is difficult in general to realize an accurately orthogonal relationship between the axial direction of the guide shaft and the longitudinal direction of the contact image sensor. In the present invention, however, since the guide shaft is directly coupled to the housing, an accurately orthogonal relationship between the axial direction of the guide shaft and the longitudinal direction of the contact image sensor is realized easily just by the housing being attached accurately to the guide shaft. In particular, since smooth sliding of the housing is realized by the sliding member, an accurate orthogonal relationship can be maintained between the axial direction of the guide shaft and the longitudinal direction of the contact image sensor even during sliding of the housing.

In the image reader of the present invention, the sliding member may be provided at each of both ends in the longitudinal direction of the housing.

In the image reader of the present invention, the sliding member may be provided with an elastic body which urges the housing.

In the image reader of the present invention, the bearing may have a pair of bosses formed integral to the housing at a pair of side surfaces, respectively, in the short direction of the housing; and each of the bosses may have a guide shaft insertion hole through which the guide shaft penetrates and which is extended in the direction orthogonal to both the longitudinal direction and the short direction.

In the image reader of the present invention, the housing may have a coupling portion to which a driving force from the sliding mechanism is transmitted.

In the image reader of the present invention, the coupling portion may be provided on the bearing.

In the image reader of the present invention, the bearing may be arranged at a center of the housing.

In the image reader of the present invention, a connector as an output terminal for signals outputted by the light receiving elements may be provided on the housing; and a cable holder which holds an electrical cable connected to the connector may be provided integral to the housing.

In the image reader of the present invention, the cable holder may be constructed of a plate-like member which is positioned in parallel to and close to a side surface in the short direction of the housing.

In the image reader of the present invention, the sliding member may further include a leaf spring which is brought in contact with a lower surface of the housing and which urges the housing; and a roller which is attached to the leaf spring.

In this case, since the urging force acts directly on the housing, the housing can be pressed stably against the contact glass plate.

DETAILED DESCRIPTION OF THE PREFERRED EMBODIMENTS

The present invention will now be explained in detail based on preferred embodiments and in reference to the drawings where suitable.

First Embodiment

Figure 1:
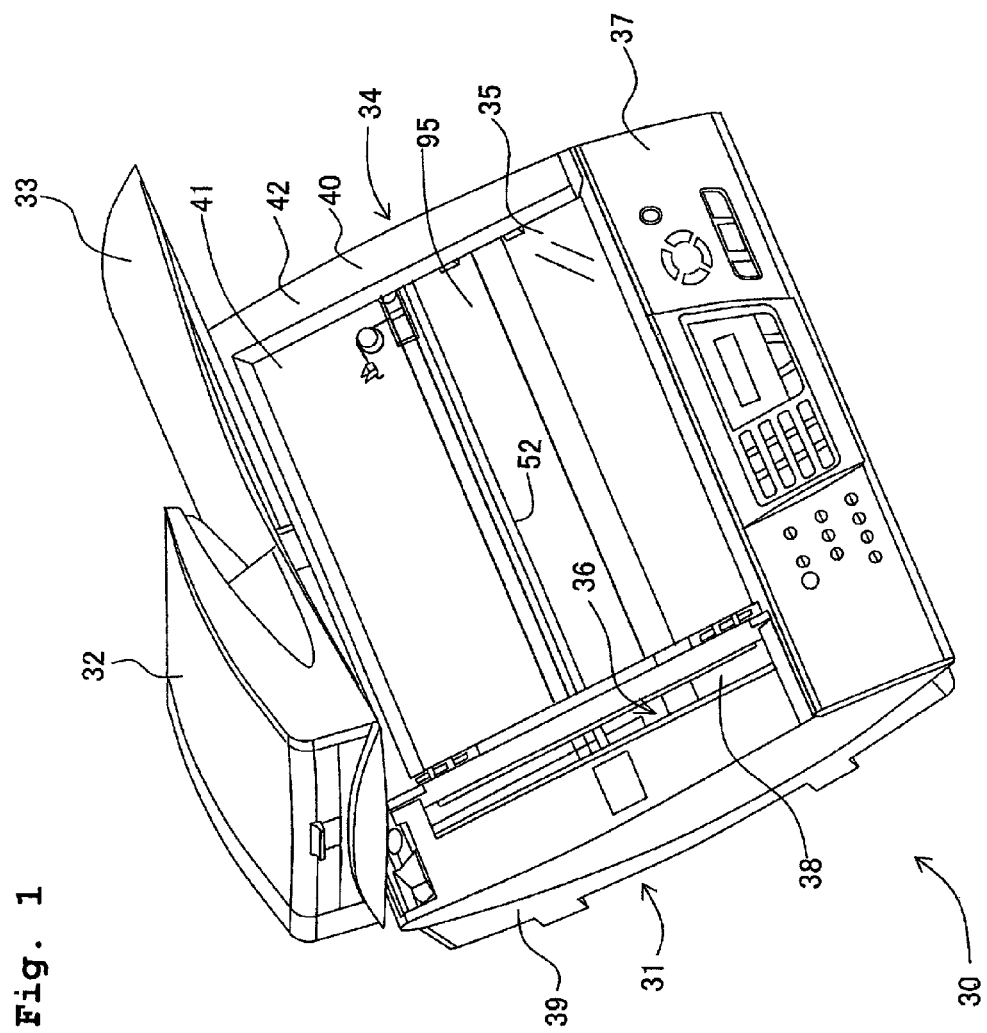
FIG. 1 is an external perspective view of an image reader according to a first embodiment of the present invention.

FIG. 1 is an external perspective view of an the image reader 30 according to a first embodiment of the present invention.

This image reader 30 may be used, for example, as a scanner unit of a multi function device (MFD) which is integrally equipped with a printer function and a scanner function, or as an image reading unit of a copier. In the present invention, the printer function is an arbitrary mechanism, and the image reader 30 may be constructed as a flatbed scanner (FBS) having the scanner function only.

As shown in FIG. 1, this image reader 30 has a reading platform 31 (document placing/reading platform) which functions as an FBS, and a document pressing cover 33 is mounted onto the reading platform 31 in an openable/closable manner. This document pressing cover 33 has an auto document feeder (ADF) 32. The reading platform 31 has a body frame 34 (casing) of substantially rectangular parallelepiped shape, a contact glass plate (light transmitting plate) 35 arranged on a top surface (upper surface) of the body frame 34, and an image reading unit 36 built-in the body frame 34. A document is placed on the contact glass plate 35. When the document pressing cover 33 is closed, the document is fixed by the document pressing cover 33. The image reading unit 36 moves below the contact glass plate 35 and along the contact glass plate 35 to read an image from the document.

An operating panel 37 is provided on a front side of the reading platform 31. The operating panel 37 has various operating buttons and a liquid crystal display unit. The image reader 30 is constructed to operate according to instructions from the operating panel 37. When the image reader 30 is constructed as an MFD, a computer may be connected to the image reader 30. In this case, the image reader 30 may be made to operate according to instructions sent from the computer via a scanner driver and the like, in addition to instructions from the operating panel 37.

As mentioned above, the document pressing cover 33 has the ADF 32 which continuously feeds or conveys documents from a document tray to a paper discharge tray. In this process of transportation by the ADF 32, a document passes across a platen 38, and the image reading unit 36 is constructed to read an image from the document from below the platen 38. In this embodiment, however, the ADF 32 may be omitted.

Figure 2:
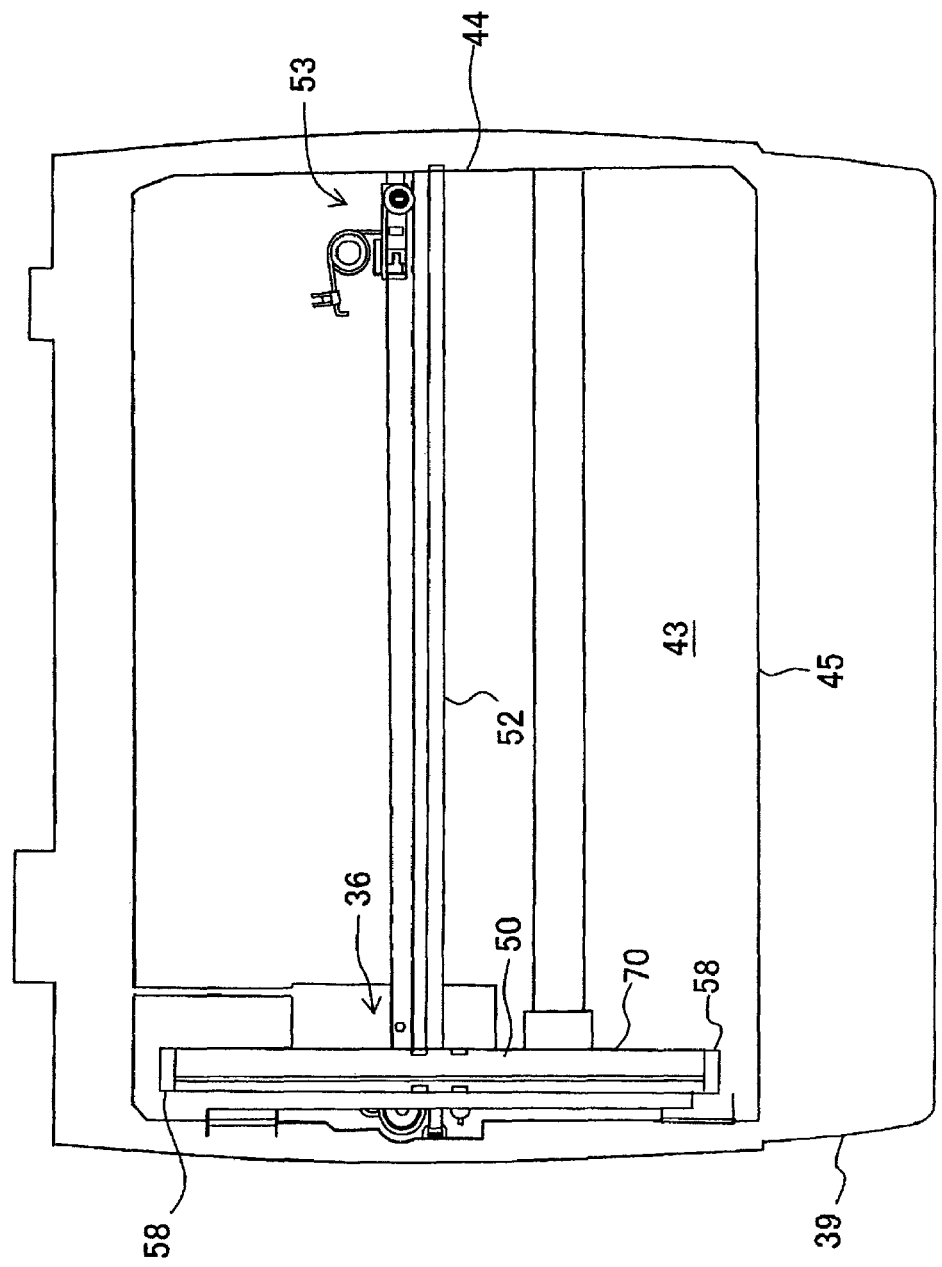
FIG. 2 is a plan view of a reading platform (document-placing/reading platform) of the image reader according to the first embodiment of the present invention.
Figure 3:
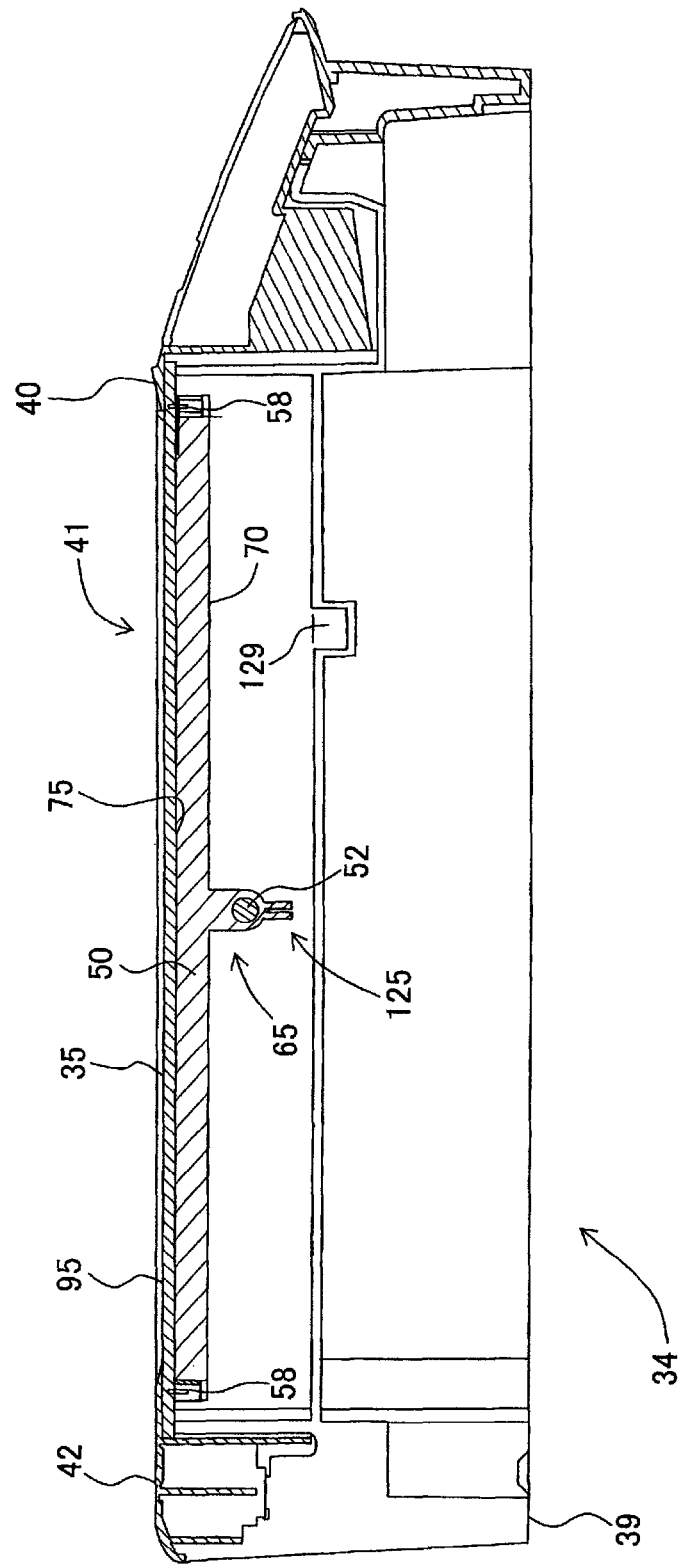
FIG. 3 is a sectional view of the reading platform of the image reader according to the first embodiment of the present invention.

FIG. 2 is a plan view of the reading platform 31 and shows an internal structure of platform 31. FIG. 3 is a sectional view of the reading platform 31.

As shown in FIGS. 1 and 3, the body frame 34 of the reading platform 31 has a lower frame 39 having a form of a container with an open upper surface, and an upper cover 42 having an opening 41 on an upper surface 40, and the body frame 34 is constructed by the upper cover 42 being fitted onto the lower frame 39 from above. The contact glass plate 35 is mounted onto the upper cover 42 so as to be exposed from the opening 41. A surface 95 of the contact glass plate forms a document placing surface, and the opening 41 defines the document placing surface.

As shown in FIG. 2, the image reading unit 36 is arranged inside the lower frame 39. The lower frame 39 and the upper cover 42 are both formed of a synthetic resin. The lower frame 39 has a base portion 43 which constructs a bottom plate, and side walls 44 and a partitioning plate 45, which are erected from surrounding portions of the base portion 43, and these are formed integrally. The partitioning plate 45 partitions a portion in which the image reading unit 36 is arranged, and a portion in which a circuit board of the operating panel 37 and the like are arranged. The lower frame 39 has a supporting rib for supporting the contact glass plate 35, a boss portion for screwing on various members, and a through hole for electrical wiring, and the like. However, since these are designed suitably according to the embodiment of the reading platform 31, detailed description thereof will be omitted.

As shown in FIG. 2, the image reading unit 36 has a CIS unit 50 (contact image sensor) and a belt driving mechanism 53 (sliding mechanism) having a guide shaft 52. The image reading unit 36 also has roller units 58 (see FIG. 3) which are not shown in FIG. 2. As shown in FIG. 3, the roller units 58 contact a rear surface 75 of the contact glass plate 35 to aid smooth movement of the CIS unit 50. The CIS unit 50 is a so-called close-contact image sensor. The CIS unit 50 irradiates light onto a document, receives reflected light from the document, and converts the received light into electrical signals. As will be described in detail later, the CIS unit 50 has a housing 70 of elongate, rectangular parallelepiped form, and this housing 70 is fitted to the guide shaft 52. This housing 70 moves below the contact glass plate 35 (see FIGS. 1 and 3).

Specifically, the guide shaft 52 is spanned across a width direction of the lower frame 39. Here, the term "width direction of the lower frame 39" is a direction which is orthogonal to a longitudinal direction of the housing 70 of the CIS unit 50 and runs along the rear surface 75 of the contact glass plate 35 (that is, a direction perpendicular to the sheet surface of FIG. 3). Hereinafter, this direction (the direction perpendicular to the sheet surface of FIG. 3) will be referred to as "short direction". The housing 70 is driven by the belt driving mechanism 53 and is moved by being slid on the guide shaft 52. As will be described in detail later, the guide shaft 52 is provided with a coil spring 63 (see FIG. 5) and is thereby elastically urged upward. The housing 70 is thereby urged so as to be in close contact with the contact glass plate 35 and is constructed to move in the short direction along the contact glass plate 35 while being pressed against the contact glass plate 35.

As shown in FIG. 3, the roller units 58 are disposed at both ends, respectively, of the CIS unit 50. Each of the roller units 58 has a roller which rolls in the short direction, and this roller contacts the rear surface 75 of the contact glass plate 35. Accordingly, when the CIS unit 50 moves in the short direction, the rollers roll along the contact glass plate 35 accompanying with the movement of the CIS unit 50. Since the roller units 58 are provided, the CIS unit 50 moves smoothly along the contact glass plate 35 even when the CIS unit 50 is pressed against the lower surface of the contact glass plate 35.

Figure 4:
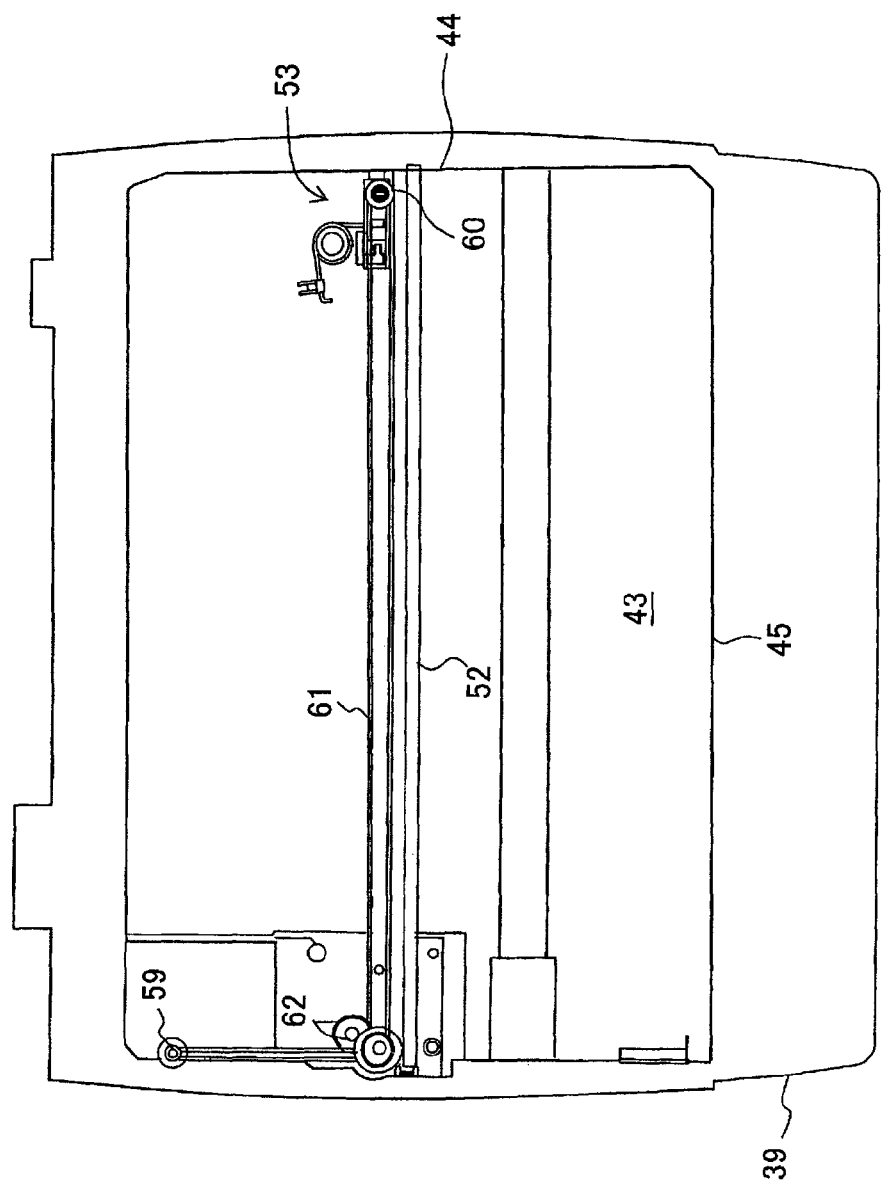
FIG. 4 is a plan view of the reading platform of the image reader according to the first embodiment of the present invention and shows a structure of a belt driving mechanism.

FIG. 4 is a plan view of the reading platform 31 and shows a general arrangement of the belt driving mechanism 53.

As shown in FIG. 4, the belt driving mechanism 53 has the guide shaft 52, a driving pulley 59, a driven pulley 60, a timing belt 61 wound around the pulleys, and an unillustrated motor. The timing belt 61 is an endless belt having teeth formed on its inner side. The timing belt 61 is constructed to undergo circumferential motion when the motor rotates the driving pulley 59.

As shown in FIG. 4, the driving pulley 59 is arranged at a left inner side (left far side) of the lower frame 39. The timing belt 61, which is wound around the driving pulley 59, extends to a front side of the lower frame 39 and is wound around an intermediate pulley 62 which is arranged in front of the guide shaft 52. Further, the timing belt 62 is bent substantially at a right angle and extended to a right end of the lower frame 39 along the guide shaft 52 and wound around the driven pulley 60 arranged close to or near the right end of the lower frame 39. Namely, as shown in FIG. 4, the timing belt 61 is spanned in a substantially L-like shape (substantially in form of a letter "L"). A portion, of the timing belt 61 thus spanned, between the driven pulley 60 and the intermediate pulley 62 of the timing belt 61, namely, the portion of the timing belt 61 along the guide shaft 52 is grasped by a coupling portion 125 (see FIGS. 6 and 7) of the housing 70, and the timing belt 61 is thereby coupled to the housing 70. Needless to say, a double-ended belt, in which both ends of the belt are affixed to a carriage 51, may be employed in place of an endless belt as the timing belt 61.

Figure 5:
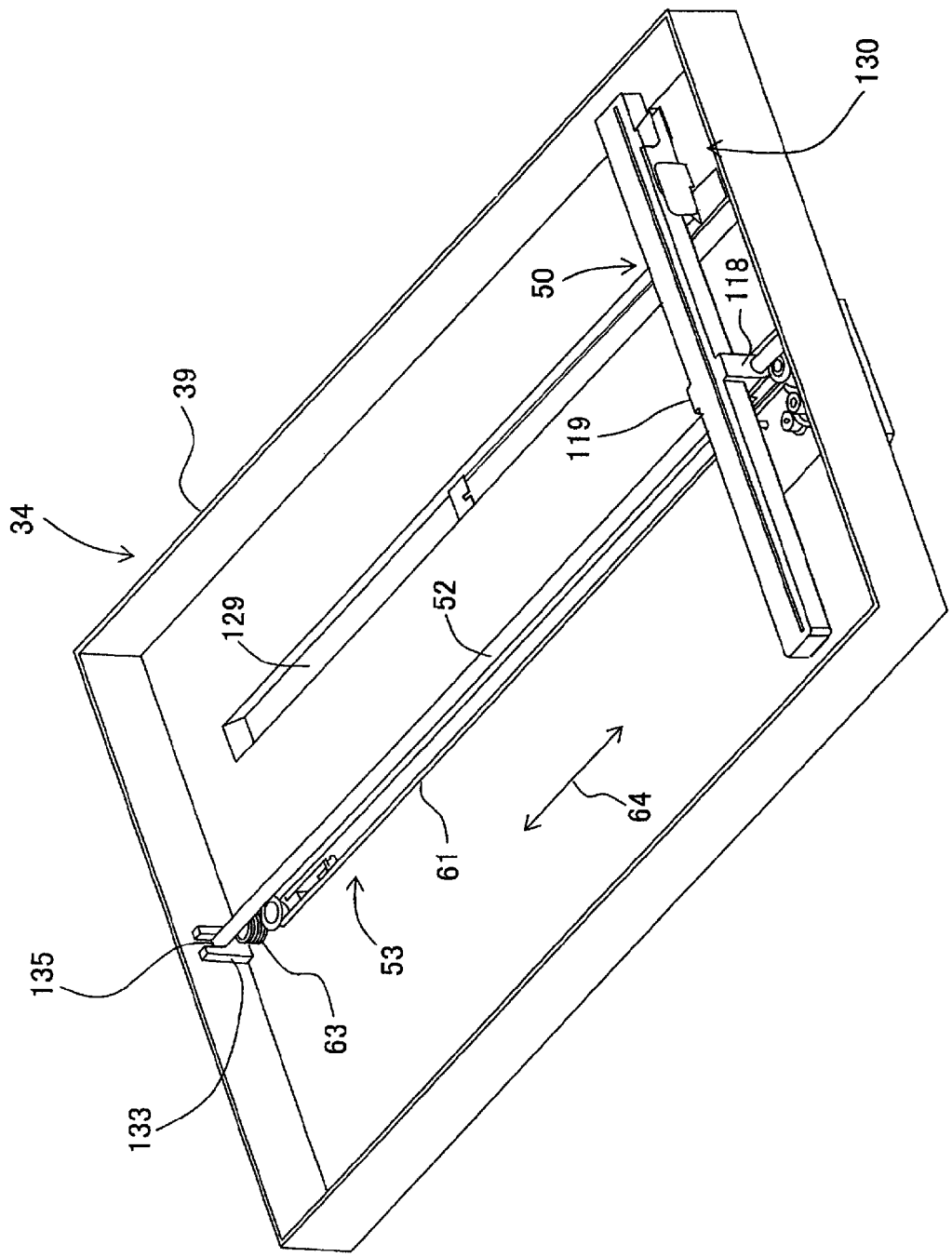
FIG. 5 is an enlarged perspective view of principal portions of the image reading unit of the image reader according to the first embodiment of the present invention.
Figure 6:
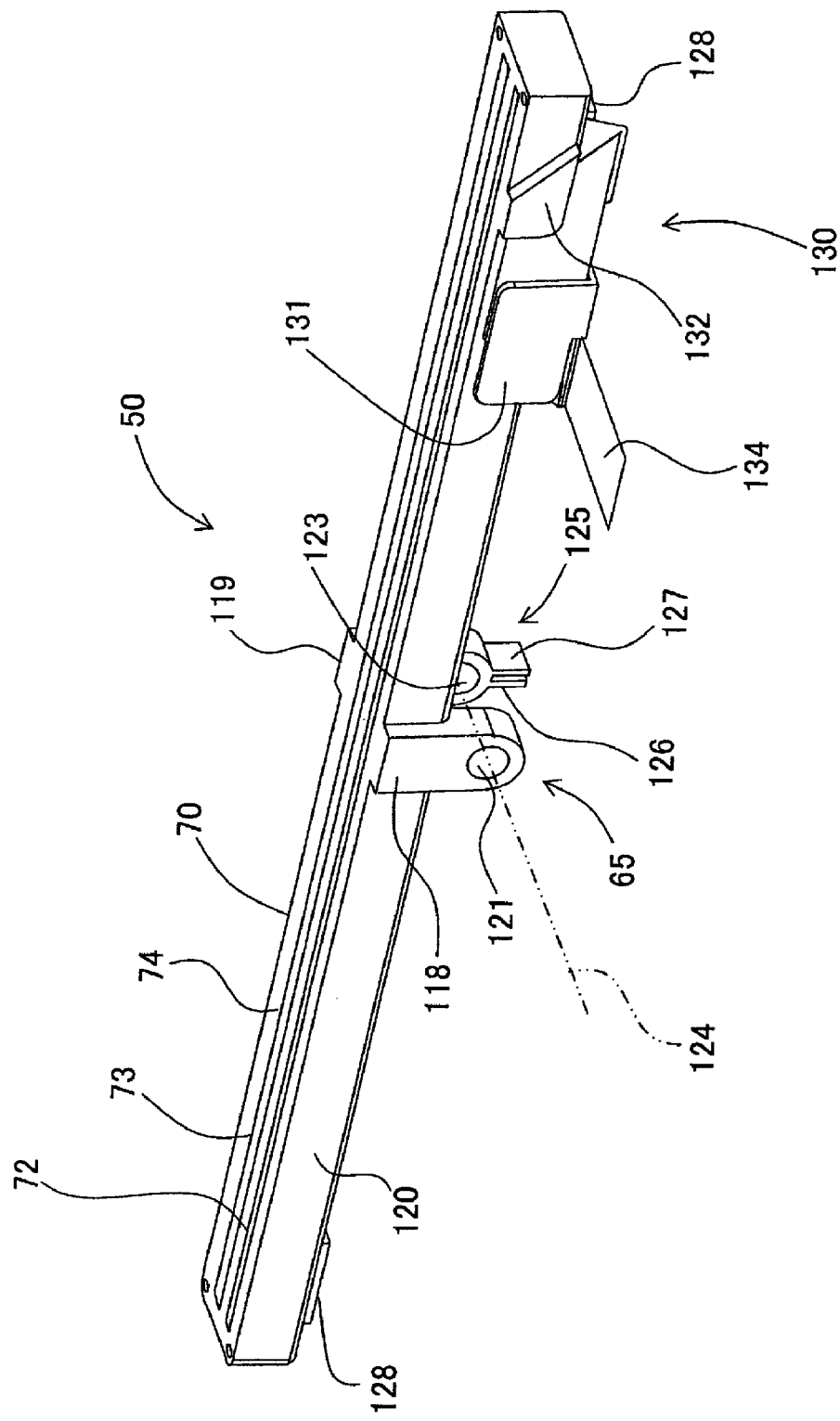
FIG. 6 is a perspective view of a CIS unit of the image reader according to the first embodiment of the present invention as viewed from an obliquely upward viewpoint.
Figure 7:
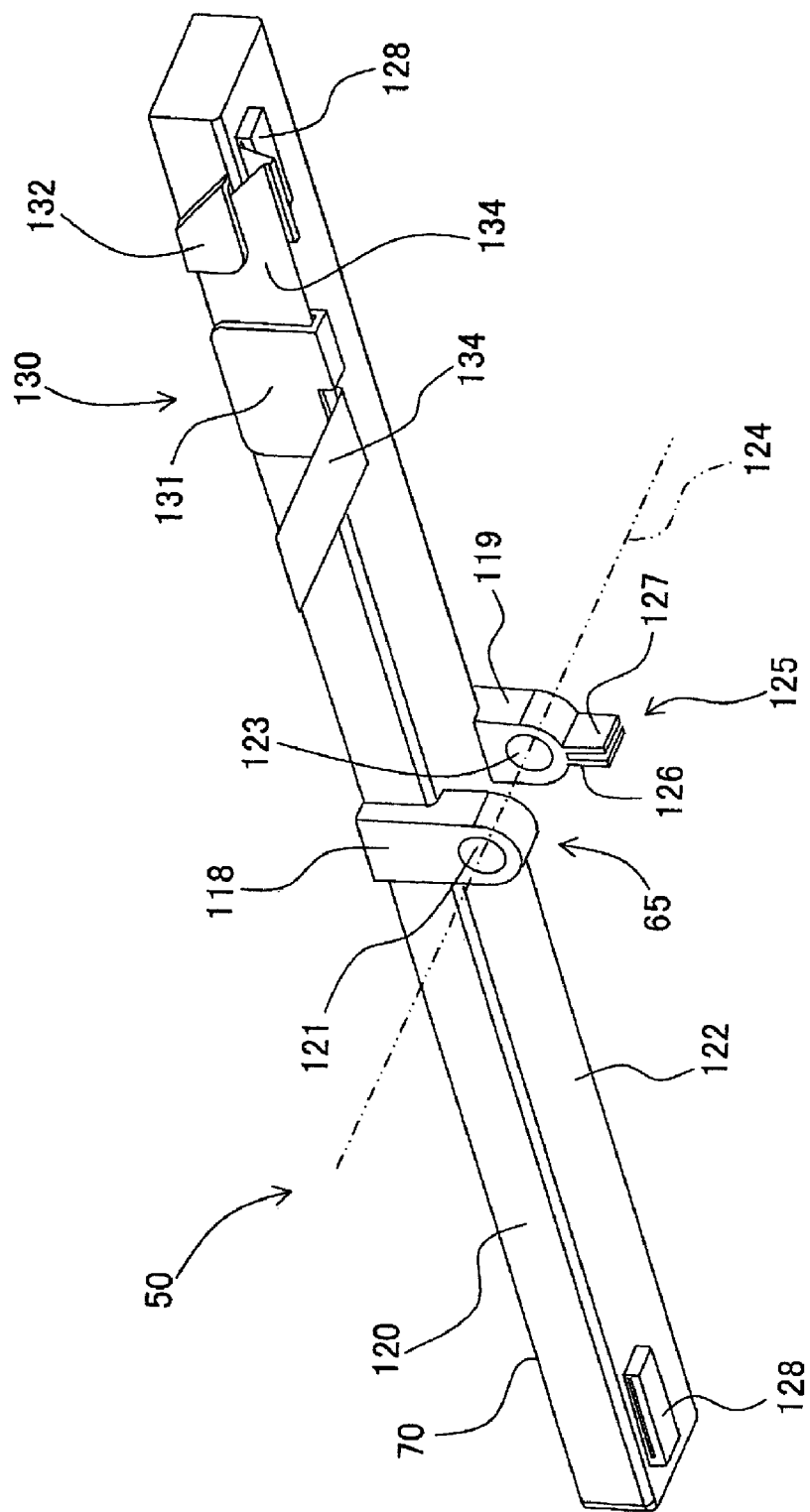
FIG. 7 is a perspective view of the CIS unit of the image reader according to the first embodiment of the present invention as viewed from an obliquely downward viewpoint.

FIG. 5 is an enlarged perspective view of principal portions of the image reading unit 36 and shows a supporting structure for the CIS unit 50. FIG. 6 is a perspective view of the CIS unit 50 as viewed from an obliquely upward viewpoint, and FIG. 7 is a perspective view of the CIS unit 50 as viewed from an obliquely downward viewpoint. In FIG. 5, in order to illustrate the supporting structure for the CIS unit 50 in detail, the structures of the belt driving mechanism 53 and the like are illustrated in a simplified manner.

As shown in FIGS. 6 and 7, the CIS unit 50 has the housing 70, a light source and a light receiving elements provided on the housing 70, and a bearing 65.

The housing 70 is formed, for example, of a synthetic resin and is formed to an elongate, rectangular parallelepiped shape as shown in these figures. The light source and light receiving element are incorporated in this housing 70. An upper surface 74 of the housing 70 faces the rear surface 75 of the contact glass plate 35 (see FIG. 3). Accordingly, the light source and the light receiving element are also arranged closely to and facing the rear surface 75 of the contact glass plate 35.

Figure 12B:
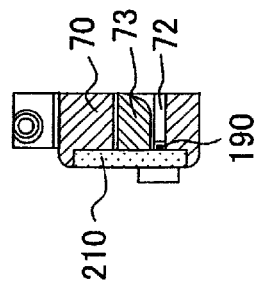
FIG. 12B is a sectional view taken along a line XIIb-XIIb in FIG. 12A.
Figure 12A:
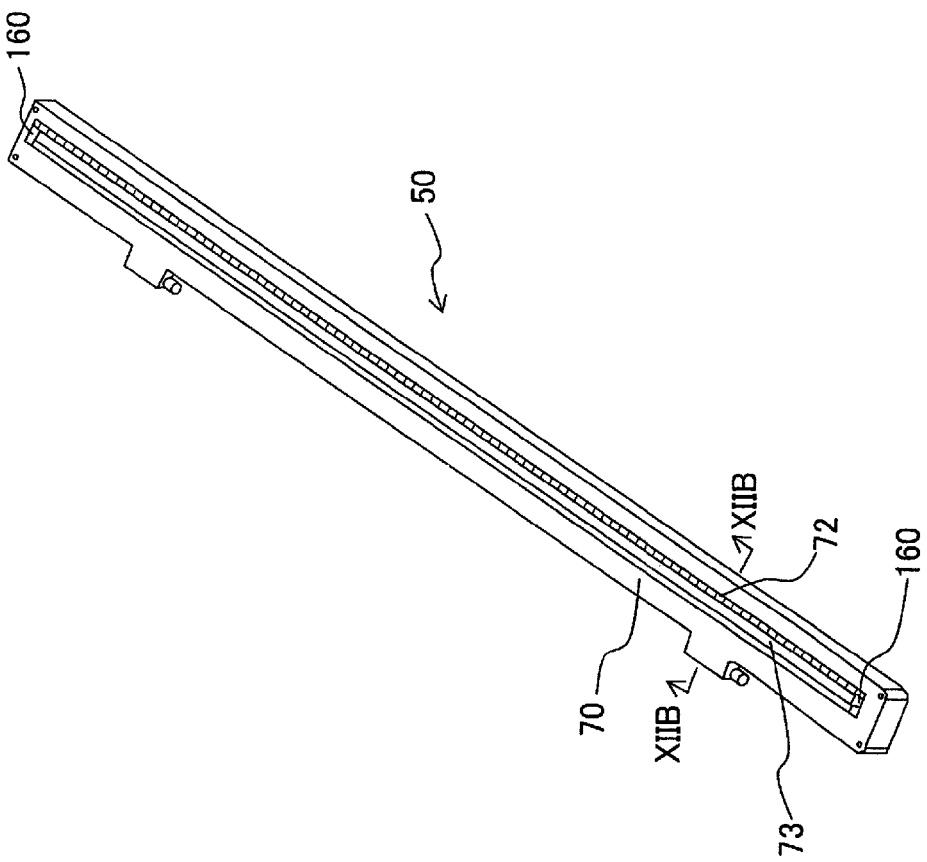
FIG. 12A is a perspective view of a general, conventional contact image sensor.

The CIS unit 50 will now be explained with reference to FIG. 12 (FIGS. 12A, 12B). In the housing 70, LEDs (Light Emitting Diodes) 160 are disposed at both ends of the housing 70 as the light source, and a light guide 73, formed of a transparent resin or glass, is embedded in the housing 70 and extended in the longitudinal direction of the housing 70. An upper portion of the light guide 73 is exposed at a surface of the housing 70. At an inner bottom portion of the housing 70, a plurality of converging lenses (optical fibers) 72 and light receiving elements 190 are aligned in array form in the longitudinal direction. These converging lenses 72 are exposed at the surface of the housing 70.

Light emitted from the LEDs 160 passes through the light guide 73, is thereby diffused substantially uniformly across the entire longitudinal direction, and is outgoes from a portion of the light guide 73 which is exposed from the housing 70. The emitted light passes through the contact glass plate 35, is reflected by a document, passes through the contact glass plate 35 again, is made incident on the converging lenses 72, and finally reaches the light receiving elements 190. The light receiving elements 190 are photoelectric conversion elements and output electrical signals based on the received light. These electrical signals are the image signals of the image expressed on the document.

A pair of bosses 118 and 119 are provided at a center of the housing 70. In this example, each of the bosses 118 and 119 is formed integral to the housing 70. The boss 118 is arranged at one side surface 120 in the short direction of the housing 70, and the boss 119 is arranged at the other side surface in the short direction of the housing 70. As shown in FIGS. 6 and 7, each of bosses 118 and 119 has an elongate, plate-like shape and projects or protrudes downwardly up to a position below a lower surface 122 of the housing 70. A through hole 121 (guide shaft insertion hole), penetrating through the boss 118 in the short direction, is provided at a lower end of the boss 118. Also, a through hole 123 (guide shaft insertion hole), penetrating through the boss 119 in the short direction, is provided at a lower end of the boss 119.

A central line of each of the through holes 121 and 123 is matched with a virtual straight line 124 which extends in the short direction, and the through holes 121 and 123 are positioned coaxially at positions below the lower surface 122 of the housing 70. As shown in FIG. 5, the guide shaft 52 is arranged to be inserted through the through holes 121 and 123. With this arrangement, a bearing 65, in which the guide shaft 52 is inserted and supported, is thus constructed by the portion of the boss 118 in which the through hole 121 is provided and the portion of the boss 119 in which the through hole 123 is provided.

The housing 70 is provided with the coupling portion 125. This coupling portion 125 grasps the timing belt 61 (see FIG. 4) of the belt driving mechanism 53, and a driving force for sliding the housing 70 is transmitted to the coupling portion 125 from the belt driving mechanism 53. In this embodiment, the coupling portion 125 is arranged at the bearing 65. Specifically, this coupling portion 125 has a pair of flat plates 126 and 127 and these plates are positioned so as to oppose each other in the longitudinal direction of the housing 70. The timing belt 61 is sandwiched and fixed by the flat plates 126 and 127. Thus, when the driving force is transmitted from the belt driving mechanism 53 to the coupling portion 125, the CIS unit 50 slides in the short direction of the housing 70 (in a direction indicated by an double-pointed arrow 64 in FIG. 5).

The housing 70 has connectors 128 and a cable holder 130. The connectors 128 function as output terminals for the image signals outputted by the light receiving elements. However, the connectors 128 are conventional, general-purpose items complying with predetermined standards and are fixed at predetermined positions (in this embodiment, at left and right ends, respectively, in FIGS. 5 to 7) of the lower surface 122 of the housing 70. The connectors 128 are electrically connected to the light sources and the light receiving elements of the CIS unit 50 and are used to perform input and output of electrical signals with respect to the operating panel 37 and/or the above-mentioned computer. An electrical cable 134 is connected to the connectors 128.

The electrical cable 134 includes a conducting wire for supplying power to the light source of the CIS unit 50 and a conducting wire which transmits the image signals output from the light receiving elements, and is constructed as a so-called flat cable. The electrical cable 134 forms electrical signal paths between the connector 128 and the operating panel 37 and/or the above-mentioned computer. Since the CIS unit 50 is slid in the short direction (see FIG. 5) as mentioned above, the electrical cable 134 is provided with adequate flexibility so that the electrical cable 134 can follow the sliding of the CIS unit 50 while changing its orientation.

The electrical cable 134 is inserted along a cable guiding groove 129 provided in the bottom surface of the lower frame 39. The cable guiding groove 129 extends in the direction of the arrow 64, allowing the electrical cable 134 to be inserted and drawn out freely, and holds the electrical cable 134 in the state in which electrical cable 34 is fitted in the cable guiding groove 129. Thus, in accompaniment with the sliding of the CIS unit 50 in the direction of the arrow 64, the electrical cable 134 is guided in the direction of the arrow 64.

As shown in FIGS. 6 and 7, since the connectors 128 are disposed at the left and right ends, respectively, of the housing 70 in this embodiment, a position at which the end of the electrical cable 134 is connected to the connector 128 differs from a position at which the cable guiding groove 129, accommodating the electrical cable 134 therein, is arranged. In this embodiment, the electrical cable 134 is connected to one of the connectors 128 which is disposed at the right end of the housing 70. Needless to say, the electrical cable 134 may instead be connected to the other connector 128 disposed at the left end of the housing 70. For the electrical cable 134 to move smoothly while following the sliding of the CIS unit 50, the electrical cable 134 connected to the above-mentioned the connector 128 needs to be laid so as to be guided into the cable guiding groove 129. In this embodiment, the housing 70 is provided with the cable holder 130. This cable holder 130 holds the electrical cable 134, connected to the above-mentioned the connector 128, along the housing 70 and guides the electrical cable 134 into the cable guiding groove 129. In this state, the electrical cable 134 is restricted in movement in the direction of its length. However, since the electrical cable 134 is provided with flexibility as mentioned above, the electrical cable 134 follows the movement of the CIS unit 50 by changing its orientation. Also, by the cable holder 130 holding the electrical cable 134, even when the electrical cable 134 is pulled and tension arises while the CIS unit 50 is moving, any excessive mechanical load is not applied to the connector 128.

The cable holder 130 is formed integral to the housing 70. Specifically, the cable holder 130 has flat plates 131, 132 (plate-like member). The flat plates 131 and 132 are arranged parallel to the side surface 120 (side surface in the short direction) of the housing 70. These flat plates 131 and 132 are positioned close to the side surface 120 such that the flat plates are capable of holding the electrical cable 134 sandwichingly between the side surface 120 and the flat plates 131, 132. Although in this embodiment, the cable holder 130 has a structure provided with the flat plates 131 and 132 based on the positional relationship between the connector 128 and the cable guiding groove 129, the construction of the cable guiding groove 129 can be changed suitably in design when the positional relationship between the connector 128 and the cable guiding groove 129 is changed. That is, it is sufficient that the cable holder 130 has a structure which can hold the electrical cable 134 so that the electrical cable 134, connected to the above-mentioned the connector 128, is guided into the cable guiding groove 129. In particular, since the cable holder 130 is constructed of the flat plates 131 and 132 in this embodiment, there is an advantage that the structure of the cable holder 130 is extremely simple.

As shown in FIGS. 3 and 5, the guide shaft 52 supports the bearing 65 of the housing 70. Specifically, the guide shaft 52 passes through the through holes 121 and 122 provided in the bosses 118 and 119, respectively, thereby supporting the CIS unit 50. The housing 70 is made slidable in the axial direction of the guide shaft 52 (the above-mentioned short direction) in the state that the housing 70 is supported by the guide shaft 52.

Also, the guide shaft 52 is supported by a pair of supporting plates 133. Although these supporting plates 133 are provided at both ends, respectively, in the short direction of the lower frame 39, only one of the supporting plates 133 is shown in the figure. The supporting plates 133 may be formed integral to the lower frame 39. As shown in FIG. 5, each of the supporting plates 133 is a plate-like member and, in this embodiment, the supporting plates 133 are provided on a bottom portion of the lower frame 39 in an upright manner. Each of the supporting plates 133 has a supporting groove 135 which extends in the vertical direction. This supporting groove 135 is open at an upper end thereof as shown in FIG. 5, and the guide shaft 52 is fitted from above into the supporting groove 135. The width dimension of the supporting groove 135 is set according to the outer diameter dimension of the guide shaft 52. Accordingly, the supporting groove 135 restricts the movement of the guide shaft 52 in the longitudinal direction while allowing movement of the guide shaft 52 in the vertical direction.

Further, the lower frame 39 has the coil spring 63 (urging member). The coil spring 63 is interposed between an inner bottom surface of the lower frame 39 and the guide shaft 52. The coil spring 63 constantly urges the guide shaft 52 upwardly. In this embodiment, two pieces of the coil spring 63 are provided, and each of the coil springs 63 is arranged close to the above-described supporting plate 133. Thus, the coil springs 63 urge the both ends of the guide shaft 52 upwardly, and press the housing 70 elastically against the contact glass plate 35. Accordingly, even when there is distortion of the lower frame 39, the CIS unit 50 and the contact glass plate 35 are always positioned close to each other, keeping the distance between the CIS unit 50 and the contact glass plate 35 to be constant. As a result, the CIS unit 50 can exhibit a stable image reading function.

Needless to say, only one piece of the coil spring 63 may be provided at a central portion of the guide shaft 52. That is, it is sufficient that the coil spring 63 is capable of urging the guide shaft 52 upward reliably at a fixed elastic force. In addition to the coil spring, a member formed of an elastic material, such as a rubber body, a foam body and the like having a desired shape, may be employed as the urging member provided that such a member is capable of urging the guide shaft 52 upward reliably at a fixed elastic force. In this embodiment, since the coil spring 63 is employed as the urging member, there are advantages such that the urging force applied to the guide shaft 52 can be designed easily and freely, and that the structure for urging the guide shaft 52 is made extremely simple.

The image reader 30 according to this embodiment reads an image from a document according to the following procedure. First, a document is placed or set on the surface 95 of the contact glass plate 35 which is the document placing surface (see FIGS. 1 and 3). In this state, the CIS unit 50 scans the document while being slid by the belt driving mechanism 53. Specifically, while the CIS unit 50 is slid along the guide shaft 52, the light sources provided in the housing 70 of the CIS unit 50 irradiate light onto the document, and the light receiving elements receive the reflected light. The light receiving element outputs predetermined signals (image signals) based on the received light.

As shown in FIGS. 5 and 6, since the guide shaft 52 is inserted through the bearing 65, the guide shaft 52 is directly attached to the housing 70 of the CIS unit 50. Namely, the image reader 30 according to this embodiment does not have a holder which holds the housing 70 of the CIS unit 50, and thus the number of parts constructing the image reader 30 is reduced. By reducing the number of parts in this manner, the CIS unit 50 is positioned precisely with respect to the guide shaft 52.

To explain in detail, for an image to be read finely from a document, the longitudinal direction of the CIS unit 50 (normally referred to as the "primary scanning direction") and the axial direction of the guide shaft 52 (normally referred to as the "secondary scanning direction") need to be orthogonal when the CIS unit 50 is sliding. In this situation, as in a conventional case, when the CIS unit 50 is coupled to the guide shaft 52 via the housing 70 and the holder which holds the housing 70, the precision of positioning of the CIS unit 50 with respect to the guide shaft 52 (precision of orthogonality between the CIS unit 50 and the guide shaft 52) is determined by factors such as the precision of attachment of the housing 70 to the holder and the precision of attachment of the holder to the guide shaft 52. Accordingly, in general, any accurate orthogonal relationship cannot be realized easily between the axial direction of the guide shaft 52 and the longitudinal direction of the CIS unit 50. In this embodiment, however, since the guide shaft 52 is directly coupled to the housing 70, an accurate orthogonal relationship can be realized easily between the axial direction of the guide shaft 52 and the longitudinal direction of the CIS unit 50, by just attaching the housing 70 accurately with respect to the guide shaft 52.

In this embodiment, since the housing 70 of the CIS unit 50 is provided with the bearing 65, the number of parts of the image reader 30 is reduced, and consequently the CIS unit 50 and the image reader 30 in which the CIS unit 50 is incorporated are constructed at low cost. In addition, by reducing the number of parts, the housing 70 of the CIS unit 50 is directly attached to the guide shaft 52, the axial direction of the guide shaft 52 and the longitudinal direction of the CIS unit 50 are accurately orthogonal, thereby realizing image reading with high precision.

In particular, in this embodiment, since the bearing 65 is constructed by providing the through holes 121 and 123 in the pair of bosses 118 and 119, the structure of the bearing 65 is extremely simple. Therefore, the manufacturing cost of the image reader 30 is further reduced.

Also in this embodiment, the driving force for sliding the CIS unit 50 is transmitted to the coupling portion 125 provided on the housing 70. This coupling portion 125 serves as an action point to which the driving force acts. Accordingly, since the housing 70 receives the driving force directly, rapid and smooth sliding of the CIS unit 50 is realized. In particular, in this embodiment, since the coupling portion 125 is provided on the bearing 65, the bearing 65 receives the driving force. Further, since the bearing 65 is in a state of being supported by the guide shaft 52, the action point of the driving force is positioned close to the guide shaft 52. Thus, even when the driving force acts on the bearing 65, a rotational moment which is applied to the housing 70 (the moment which rotates the housing 70 with respect to the axial direction of the guide shaft 52) is small. Accordingly, there are advantages such that when the housing 70 slides with respect to the guide shaft 52, the tilting of the CIS unit 50 is prevented reliably and that the orthogonal relationship between the axial direction of the guide shaft 52 and the longitudinal direction of the CIS unit 50 is maintained reliably.

Furthermore, in this embodiment, since the bosses 118, 119 are arranged at the center of the housing 70, the bearing 65 is consequently arranged also at the center of the housing 70, and thus the housing 70 is supported at its center by the guide shaft 52. Accordingly, when the housing 70 slides with respect to the guide shaft 52, the above-mentioned rotational moment is smaller and as a result, an advantage is obtained that the orthogonal state between the axial direction of the guide shaft 52 and the longitudinal direction of the CIS unit 50 is maintained even more reliably.

In addition, in this embodiment, since the cable holder 130, which holds the electrical cable 134, is arranged in the housing 70 as shown in FIGS. 6 and 7, the electrical cable 134 is wired compactly. Also, by the electrical cable 134 being held by the cable holder 130 as described above, any excessive mechanical load is not applied to the connector even when tension arises in the electrical cable 134.

Furthermore, since the cable holder 130 and the housing 70 are provided integrally, the cable holder 130 can be manufactured inexpensively together with the housing 70. Namely, in a conventional case, the manufacturing cost of the image reader is increased because a member for wiring the electrical cable 134 is manufactured as a part separate from the housing 70. On the other hand, in the present invention, the number of parts of the image reader 30 is further reduced, thereby further reducing manufacturing cost.

Figure 8:
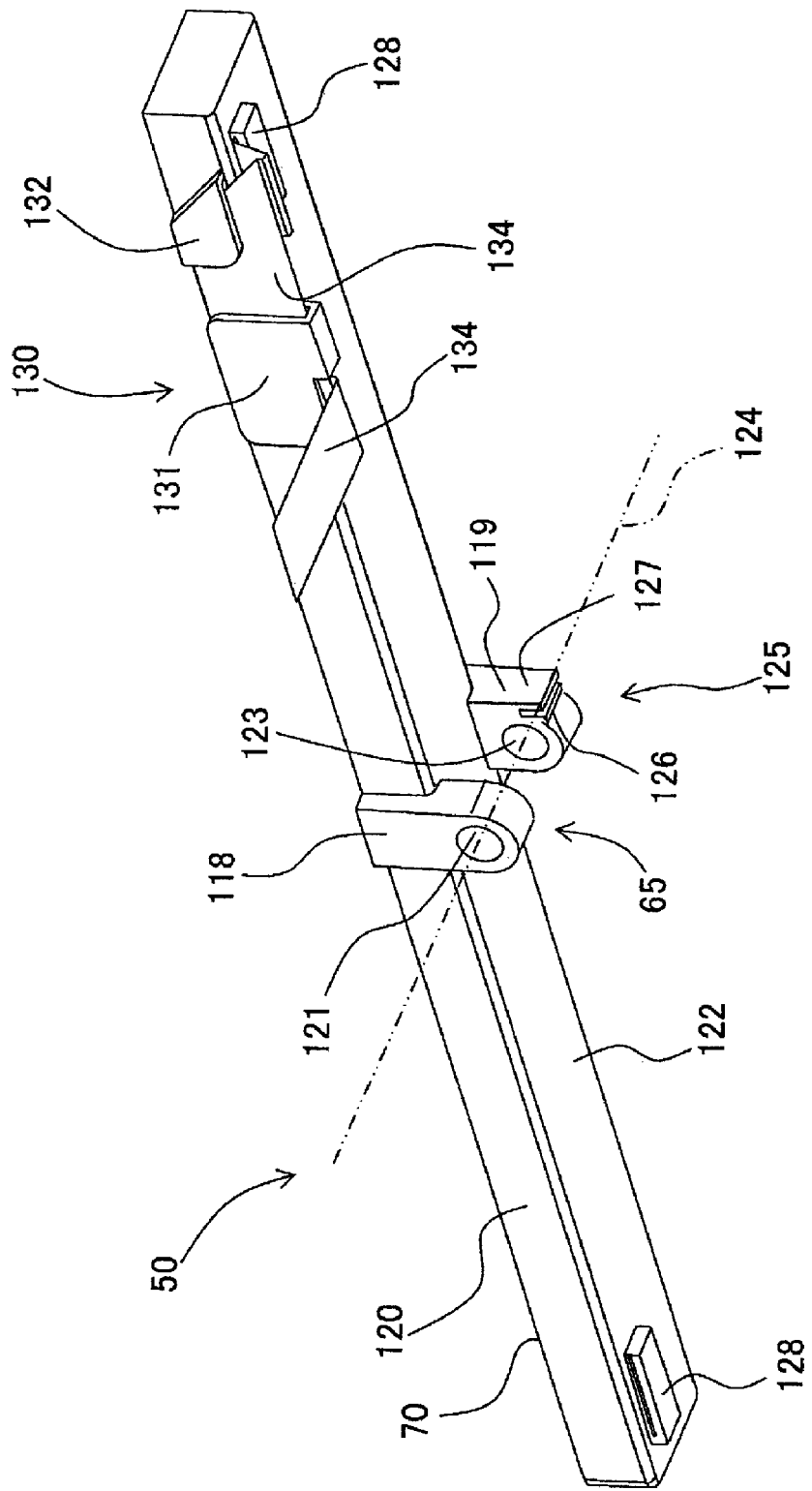
FIG. 8 is a perspective view of a CIS unit according to a modified example of the first embodiment of the present invention as viewed from an obliquely downward viewpoint.

In this embodiment, as shown in FIGS. 6 and 7, although the coupling portion 125 is arranged directly below the boss 119 constructing the bearing 65, the coupling portion 125 may be disposed at another position. For example, as shown in FIG. 8, the coupling portion 125 may be formed by providing the pair of flat plates 126 and 127 at a side of the boss 119.

Second Embodiment

A second embodiment of the present invention will now be explained.

Figure 9:
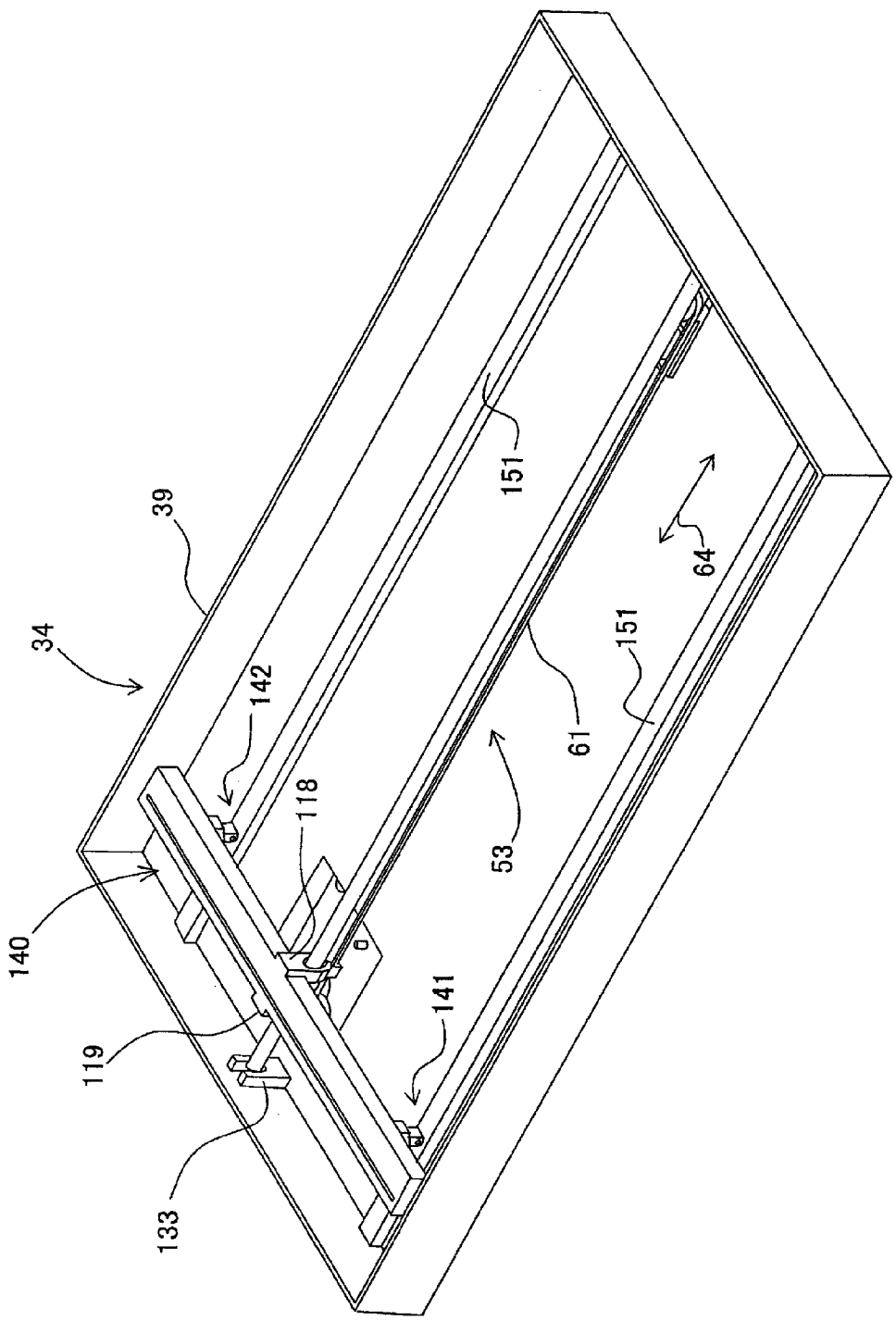
FIG. 9 is an enlarged perspective view of principal portions of an image reading unit of an image reader according to a second embodiment of the present invention.

FIG. 9 is an enlarged perspective view of principal portions of an image reading unit of an image reader according to a second embodiment of the present invention.

The image reading unit according to this embodiment differs from the image reading unit according to the above-described first embodiment in that, although in the first embodiment, the guide shaft 52 supports the CIS unit 50 in a slidable manner in the short direction and the guide shaft 52 is elastically urged upward by the coil springs 63, whereas in the second embodiment, the guide shaft 52 passes through a CIS unit 140 in a state in which the CIS unit 140 is movable in the vertical direction (the direction orthogonal to both the longitudinal direction and the short direction); and slide rollers 141 and 142 as sliding member provided on the CIS unit 140 elastically urge the CIS unit 140 upward and aid smooth sliding of CIS unit 10. The structure of the remaining parts or components of the image reader according to this embodiment are the same as those of the image reader 30 according to the first embodiment. However, in FIG. 9, the connector 128, the cable guiding groove 129, and the cable holder 130 are omitted.

Figure 10:
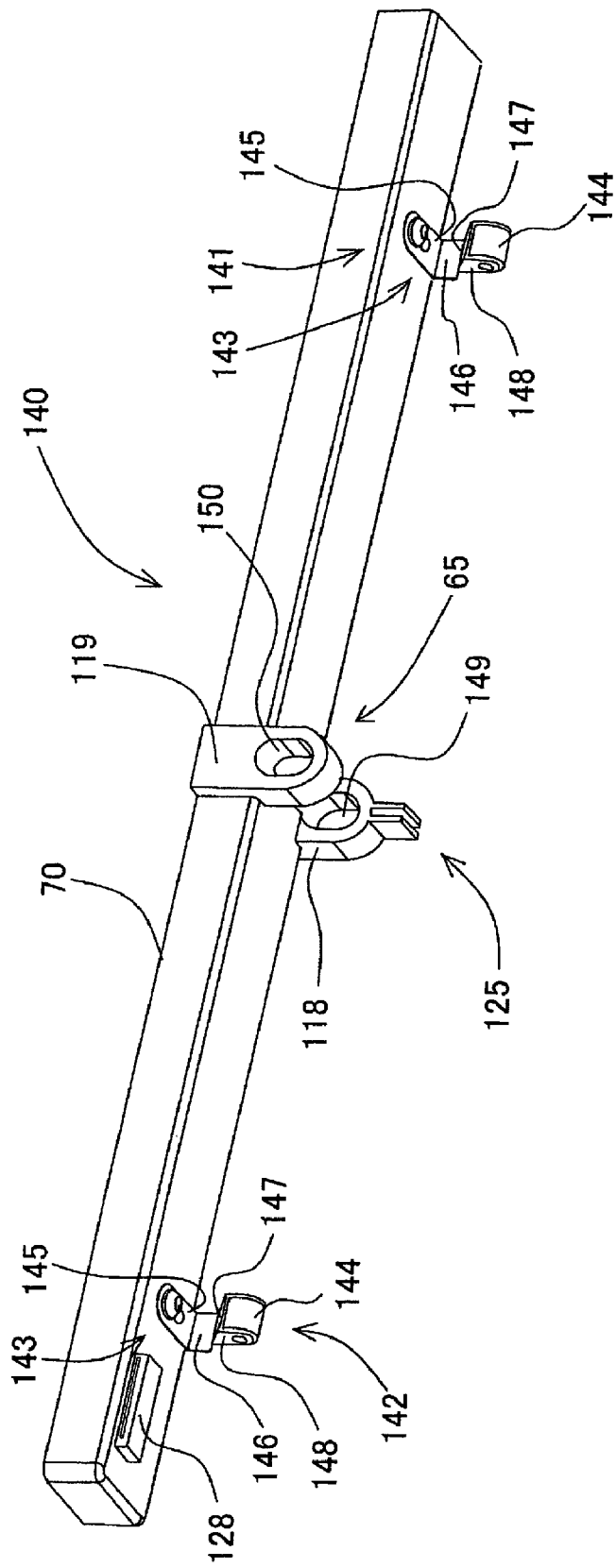
FIG. 10 is a perspective view of a CIS unit of the image reader according to the second embodiment of the present invention.
Figure 11:
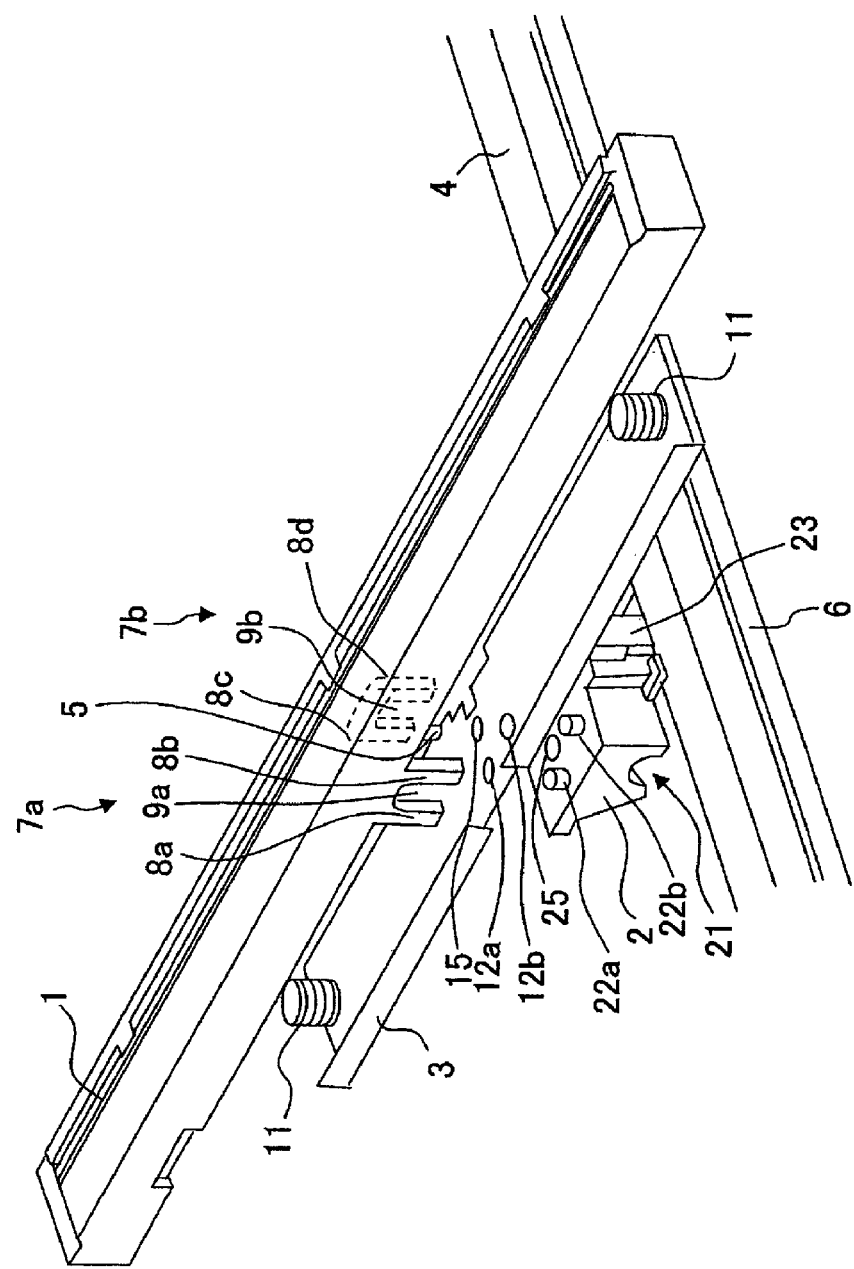
FIG. 11 is an exploded perspective view of a fixing structure of a close-contact image sensor of a conventional image reader.

FIG. 10 is a perspective view of the CIS unit 140 according to this embodiment.

As similar to the CIS unit 50 according to the first embodiment, the CIS unit 140 has a housing 70, and the above-mentioned light sources and light receiving elements are incorporated in the housing 70. Although not shown, the above-mentioned light guide and converging lenses are exposed on the upper surface of the housing 70. The connectors 128 are arranged on the lower surface of the housing 70.

The slide rollers 141 and 142 are attached to the lower surface of the housing 70. In this embodiment, the pair of slide rollers 141 and 142 is arranged at both ends, respectively, in the longitudinal direction of the housing 70. The slide roller 141 has a roller frame 143 and a roller 144 supported thereby. The roller frame 143 has a fixed portion 145 which is contacted with and fixed to the lower surface of the housing 70, an extended portion 146 which is continuous to the fixed portion 145 and extends downwardly, and a leg portion 147 which continues further from the extended portion 146 and extends obliquely downwardly. The fixed portion 145, the extended portion 146, and the leg portion 147 are formed integrally from a so-called spring steel (leaf spring). The leg portion 147 has a pair of roller supporting tabs 148, and the roller 144 is rotatably supported by the roller supporting tabs 148. As shown in this figure, since the extended portion 146 and the leg portion 147 are formed in a substantially L-like form (substantially in a shape of letter "L"), the roller 144 can displace in the vertical direction by elastic deformation of the extended portion 146 and the leg portion 147. In this embodiment, the fixed portion 145 of the roller frame 143 is affixed to the housing 70 by a screw. However, a means for fixing the fixed portion 145 is not limited to a screw, and another known means may be employed. The slide roller 142 has a similar construction as that of the slide roller 141. Accordingly, any explanation for the slide roller 142 will be omitted.

In this embodiment, the sliding member is constructed of the roller frame 143 formed of an elastic body and a the roller 144 supported thereby. However, the sliding member is not limited to this construction. Namely, it is clear that any elastic body formed of, for example, a resin such as urethane rubber, polyoxymethylene (POM) or the like, a spring such as a leaf spring, coil spring, helical spring or the like, or any other elastic body can be used provided that the elastic body is capable of urging the CIS unit 140 toward the contact glass plate 35. Further, in place of the roller 144, a sliding leg having a downwardly protruding curved surface or spherical surface may be used. In this case, it is further effective when the sliding leg is formed of a member of low frictional coefficient. Furthermore, the number of the sliding members is not limited to two, and a single sliding member may be arranged at a substantially central portion of the CIS unit 140. Alternatively, not less than three pieces of sliding members may be arranged according to the length the CIS unit 140.

Similarly to the above-described first embodiment, bosses 118 and 119 are formed on the housing 70. The bosses 118 and 119 construct the bearing 65, and the coupling portion 125 is formed on the boss 118. A through hole 149 (guide shaft insertion hole) which penetrates the boss 118 through in the short direction is provided at the lower end of the boss 118. Also, a through hole 150 (guide shaft insertion hole) which penetrates the boss 119 through in the short direction is provided at the lower end of the boss 119. The central lines of the through holes 149 and 150 are matched, and the through holes 149 and 150 are positioned coaxially at a position below the lower surface of the housing 70.

As shown in this figure, the through holes 149 and 150 are constructed as slotted holes (elongated holes) extending in the vertical direction. The guide shaft 52 is inserted through the through holes 149 and 150. Accordingly, the CIS unit 140 is constructed to be movable relative to the guide shaft 52 in the vertical direction. In this embodiment, the housing 70 is provided with the pair of slide rollers 141 and 142. Accordingly, the CIS unit 140 is elastically urged upward by the elastic force of the roller frame 143 in a state that the guide shaft 52 is inserted through the housing 70 as shown in FIG. 9. Namely, the CIS unit 140 is constructed to move upwardly relative to the guide shaft 52 so that the upper surface of the CIS unit 140 is pressed against the rear surface 75 of the contact glass plate 35.

In this embodiment, as shown in FIG. 9, rail portions 151 are formed on the inner bottom surface of the lower frame 39. Each of the rail portions 151 is formed to a plate-like shape and is formed integral to the lower frame 39 at both end portions, respectively, of the lower frame 39. The rail portions 151 are provided in correspondence to the positions of the slide rollers 141, 142, and the rail portions 151 support the slide rollers 141 and 142 when the CIS unit 140 is slid. Although the rail portions 151 may be omitted, the rail portions 151 have an advantage when provided that extremely smooth rolling of slide rollers 141 and 142 is realized.

In this embodiment, as shown in FIGS. 9 and 10, the guide shaft 52 is inserted through the bearing 65. Accordingly, the guide shaft 52 is directly attached to the housing 70 of the CIS unit 140. Namely, the image reader 30 according to this embodiment does not have a holder which holds the housing 70 of the CIS unit 140, and the number of parts constructing the image reader 30 is thus reduced. In addition, by reducing the number of parts in this manner, the CIS unit 140 is positioned precisely with respect to the guide shaft 52.

To describe in detail, for an image to be read finely from a document, the longitudinal direction of the CIS unit 140 (normally referred to as the "primary scanning direction") and the axial direction of the guide shaft 52 (normally referred to as the "secondary scanning direction") needs to be orthogonal when the CIS unit 140 is sliding. In this situation, as in the conventional case, when the CIS unit 140 is coupled to the guide shaft 52 via the housing 70 and the holder which holds the housing 70, the precision of positioning of the guide shaft 52 with respect to the CIS unit 140 (precision of orthogonality between the guide shaft 52 and the CIS unit 140) is determined by factors such as the precision of attachment of the housing 70 to the holder and the precision of attachment of the holder to the guide shaft 52. Accordingly, in general, an accurate orthogonal relationship cannot be realized easily between the axial direction of the guide shaft 52 and the longitudinal direction of the CIS unit 140. In this embodiment, however, since the guide shaft 52 is directly coupled to the housing 70 similarly to in the first embodiment, an accurate orthogonal relationship can be realized easily between the axial direction of the guide shaft 52 and the longitudinal direction of the CIS unit 140 only by attaching the housing 70 precisely with respect to the guide shaft 52. In addition, in this embodiment, smooth sliding of the CIS unit 140 is realized by slide rollers 141 and 142. Accordingly, the accurate orthogonal relationship between the axial direction of the guide shaft 52 and the longitudinal direction of the CIS unit 140 is maintained even while the CIS unit 140 is sliding.

Thus, in this embodiment, since the housing 70 of the CIS unit 140 is provided with the bearing 65, the number of parts of the image reader 30 is reduced, and the CIS unit 140 and the image reader 30 in which the CIS unit 140 is incorporated are thus constructed at low cost. In addition, by the reduction of the number of parts, the housing 70 of the CIS unit 140 is directly attached to the guide shaft 52. Accordingly, the axial direction of the guide shaft 52 and the longitudinal direction of the CIS unit 140 are orthogonal accurately, thereby realizing image reading of high precision.

Also, in this embodiment, since the bearing 65 is formed by providing the through holes 149 and 150 in the pair of bosses 118 and 119, respectively, the structure of the bearing 65 is extremely simple. The manufacturing cost of the image reader 30 is thus reduced further.

Furthermore, in this embodiment, the driving force for sliding the CIS unit 140 is transmitted to the coupling portion 125 provided on the housing 70. This coupling portion 125 serves as an action point on which the driving force acts. Since the housing 70 thus receives the driving force directly, rapid and smooth sliding of the CIS unit 140 is realized. In particular, in this embodiment, the coupling portion 125 is provided on the bearing 65. Accordingly, the bearing 65 receives the driving force. Further, since the bearing 65 is in a state of being supported by the guide shaft 52, the action point of the driving force is positioned in the vicinity of the guide shaft 52. Thus, even when the driving force acts on the bearing 65, a rotational moment applied to the housing 70 (the moment which rotates the housing 70 with respect to the axial direction of the guide shaft 52) is small. Thus, there are advantages such that the CIS unit 140 is prevented from tilting reliably when the housing 70 slides with respect to the guide shaft 52, and that the orthogonal relationship between the axial direction of the guide shaft 52 and the longitudinal direction of the CIS unit 140 is maintained reliably.

Also with this embodiment, since bosses 118 and 119 are arranged at the center of the housing 70, the bearing 65 is also disposed at the center of the housing 70, and the housing 70 is thus supported at its center by the guide shaft 52. Thus, when the housing 70 slides with respect to the guide shaft 52, the above-mentioned rotational moment is smaller, and consequently, there is an advantage that the orthogonal state between the axial direction of the guide shaft 52 and the longitudinal direction of the CIS unit 140 is maintained even more reliably.

Also, although not shown in FIGS. 9 and 10, the cable holder 130, which holds the electrical cable 134, is provided on the housing 70 in this embodiment in a similar manner in the first embodiment (see FIGS. 6 and 7). Accordingly, there is an advantage such that the electrical cable 134 is wired in a compact manner. Also, by holding the electrical cable 134 by the cable holder 130 as described above, any excessive mechanical load is not applied to the connector even when tension is generated in the electrical cable 134. Further, since the cable holder 130 and the housing 70 are provided integrally, the cable holder 130 can be manufactured together with the housing 70 inexpensively. That is, in a conventional case, the manufacturing cost of the image reader increased because the member for wiring the electrical cable 134 is manufactured as a part separate from the housing 70. On the other hand, in this embodiment, the number of parts of the image reader 30 is reduced further, thereby further reducing the manufacturing cost.

In this embodiment also, the coupling portion 125 is arranged directly below the boss 118 constructing the bearing 65 (see FIGS. 9 and 10). However, it goes without saying that the coupling portion 125 may be disposed at another position, such as at a side of the boss 118, as in the first embodiment.

In the above-described embodiments, the structure of the CIS unit is explained in which a plurality of light receiving elements is aligned in array form. However, LEDs as light sources may be aligned in array form.

What is claimed is:

1. A sensor, comprising:
    a housing which has an elongate rectangular parallelepiped shape and which is moved along a predetermined guide in a short direction of the housing;
    a light source attached to the housing;
    a light guide which is provided on the housing to be exposed on a surface of the housing and extended in a longitudinal direction of the housing; and
    a plurality of light receiving elements attached to the housing and aligned in parallel along the longitudinal direction of the housing;
    wherein the housing comprises:
    an accommodating portion configured to accommodate the light source, the light guide, and the plurality of light receiving elements; and
    a leg portion which is formed integral to the accommodating portion and extends downward from the accommodating portion, the leg portion having a contact surface which slidably makes contact with the predetermined guide.

2. The sensor according to claim 1, wherein:
    the leg portion supports the guide movably in a direction orthogonal to both the longitudinal direction and the short direction of the housing; and
    the sensor further includes a sliding member which is formed on the same side of the housing as the leg portion and elastically urges the housing in the direction orthogonal to both the longitudinal direction and the short direction of the housing and which is movable slidingly in the short direction of the housing along a predetermined plane.

3. The sensor according to claim 2, wherein the sliding member is arranged at each of both ends in the longitudinal direction of the housing.

4. The sensor according to claim 2, wherein the sliding member has an elastic body which urges the housing.

5. The sensor according to claim 1, wherein:
    the leg portion has a pair of bosses formed integral to the housing at a pair of side surfaces, respectively, in the short direction of the housing; and
    each of the bosses forms the contact surface.

6. The sensor according to claim 1, wherein the housing has a coupling portion to which a driving force from a sliding mechanism which slides the housing is transmitted.

7. The sensor according to claim 6, wherein the coupling portion is provided on the leg portion.

8. The sensor according to claim 1, wherein the leg portion is arranged at a center of the housing in the longitudinal direction.

9. The sensor according to claim 1, wherein:
    a connector which is an output terminal for signals outputted by the light receiving elements is provided on the housing; and
    a cable holder which holds an electrical cable connected to the connector is provided integral to the housing.

10. The sensor according to claim 9, wherein the cable holder is constructed of a plate-like member which is positioned in parallel to and close to a side surface in the short direction of the housing.

11. The sensor according to claim 1, wherein:
    the leg portion is formed at a position below a lower surface of the accommodating portion; and
    the guide is a shaft.

12. An image reader, comprising:
    a casing having an opening in an upper surface thereof;
    a contact glass plate, which is attached to the casing to be exposed in the opening, and in which a document placing surface is defined by peripheral edges of the opening;
    a contact image sensor which is arranged in the casing and which is slid to scan a document placed on the document placing surface; and
    a sliding mechanism which slides the contact image sensor; wherein:
    the contact image sensor includes:
        a housing which has an elongate, rectangular parallelepiped shape;
        a light source attached to the housing so as to face the contact glass plate;
        a plurality of light receiving elements which are attached to the housing so as to face the contact glass plate and which are aligned in parallel along a longitudinal direction of the housing; and
        a bearing which is provided integral to the housing at a position below a lower surface of the housing; and the sliding mechanism includes:
- a guide which is provided on the casing and which is extended in a short direction of the housing and slidably supports the bearing; and
- an urging member which elastically urges the guide toward the contact glass plate such that the housing is pressed against the contact glass plate.

13. The image reader according to claim 12, wherein:
the bearing has a pair of bosses formed integral to the housing at a pair of side surfaces, respectively, in the short direction of the housing; and
each of the bosses has a surface with which the guide slidably makes contact.

14. The image reader according to claim 12, wherein the housing has a coupling portion to which a driving force from the sliding mechanism is transmitted.

15. The image reader according to claim 14, wherein the coupling portion is provided on the bearing.

16. The image reader according to claim 12, wherein the bearing is arranged at a center of the housing in the longitudinal direction.

17. The image reader according to claim 12, wherein the urging member is a coil spring.

18. The image reader according to claim 12, wherein:
a connector which is an output terminal for signals outputted by the light receiving elements is provided on the housing; and
a cable holder which holds an electrical cable connected to the connector is provided integral to the housing.

19. The image reader according to claim 18, wherein the cable holder is constructed of a plate-like member which is positioned in parallel to and close to a side surface in the short direction of the housing.

20. The image reader according to claim 12, wherein the urging member is provided between the guide shaft and an inner bottom portion of the casing.

* * * * *